(No Model.) 2 Sheets—Sheet 1.

J. O. BOGGS.
BROILER.

No. 505,433. Patented Sept. 26, 1893.

Witnesses,
C. H. Raeder
N. F. Matthews.

Inventor
Joseph O. Boggs
By James J. Sheehy
Attorney (No Model.)  2 Sheets—Sheet 2.

J. O. BOGGS.
BROILER.

No. 505,433.  Patented Sept. 26, 1893.

Witnesses:

Inventor.
Joseph O. Boggs
By James Sheehy
Attorney

UNITED STATES PATENT OFFICE.

JOSEPH O. BOGGS, OF FAYETTEVILLE, PENNSYLVANIA, ASSIGNOR OF ONE HALF TO GEORGE W. BOTHWELL, OF JERSEY CITY, NEW JERSEY.

BROILER.

SPECIFICATION forming part of Letters Patent No. 505,433, dated September 26, 1893.

Application filed October 3, 1892. Serial No. 447,620. (No model.)

*To all whom it may concern:*

Be it known that I, JOSEPH O. BOGGS, a citizen of the United States, residing at Fayetteville, in the county of Franklin and State of Pennsylvania, have invented certain new and useful Improvements in Broilers; and I do declare the following to be a full, clear, and exact description of the invention, such as will enable others skilled in the art to which it appertains to make and use the same.

This invention relates to a device for broiling meats, fish, &c., and also for toasting bread and the like, and among its many objects and advantages might be mentioned the rapidity with which it can be operated in removing the broiler frame and replacing it with another, which is an important desideratum in hotels and large dining saloons. The fact that the smoking of the steak or other article of food while being cooked is obviated, and the broilers are rendered capable of vertical adjustment above the fire so as to cook slow or fast, and said broilers are furthermore made to rotate in their bearings so that as well as obtaining a bodily vertical adjustment of the broiler and its contents, I am enabled to turn the articles and present them to the fire at various angles, and it is a fact that such things as fish, steak and chickens may be cooked at the same time without any one carrying the scent or odor of the other to the table.

Other objects and advantages will appear from the following description and claims when taken in connection with the accompanying drawings in which—

Figure 1:
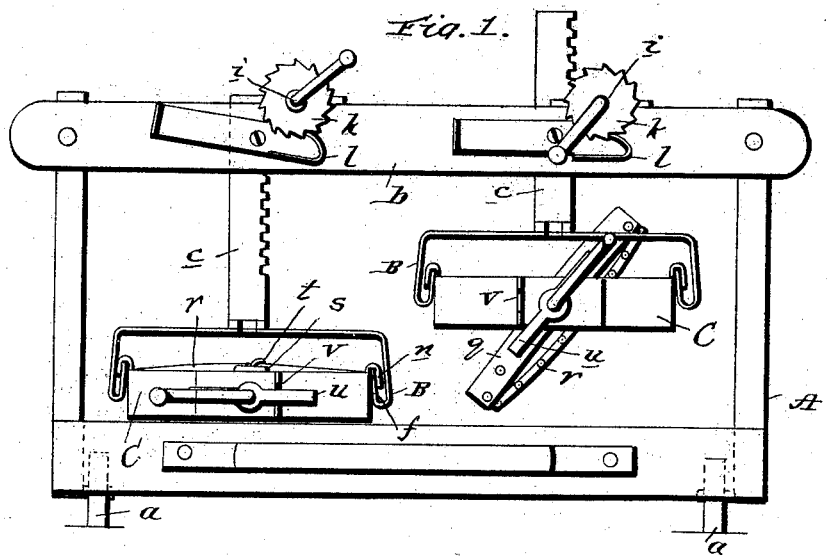
Figure 2:
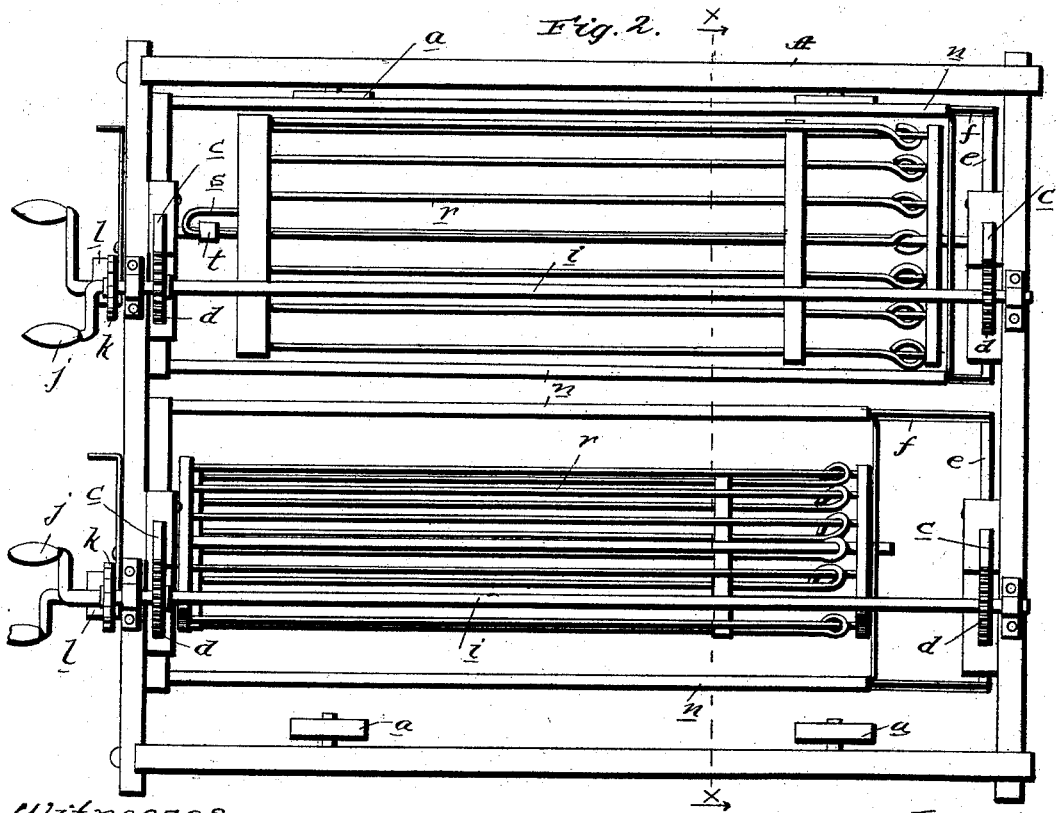
Figure 3:
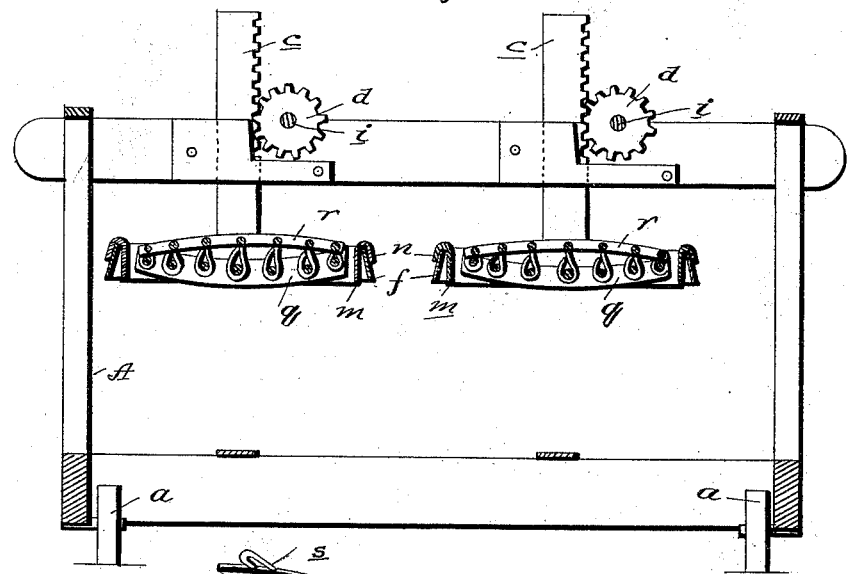
Figure 4:
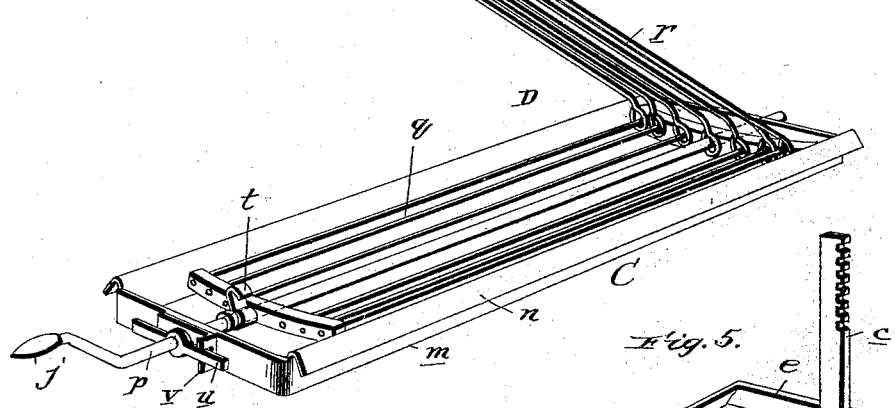
Figure 5:
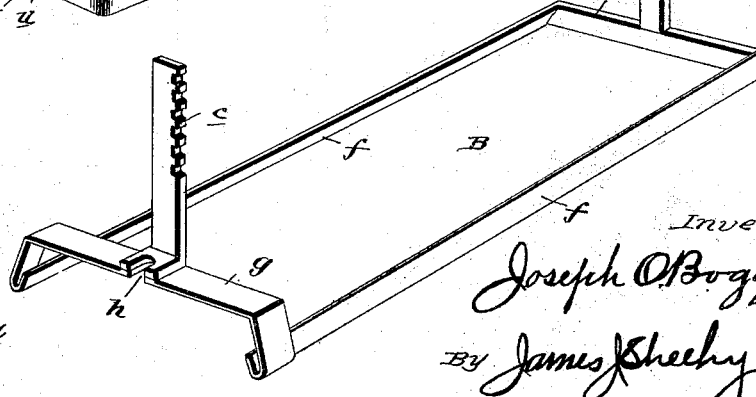

Figure 1, is a front elevation of my improved device, one of the broilers or holders being shown in its lowermost position and resting in a horizontal plane, while the other holder is shown as elevated and resting in a vertically oblique plane. Fig. 2, is a plan view of the device with two broilers in position. Fig. 3, is a vertical transverse section taken in a plane indicated by the line $x, x$, of Fig. 2, looking in the direction of the arrow. Fig. 4, is a perspective view of one of the holders or broilers removed from the frame, and Fig. 5, is a similar view of one of the suspending frames for supporting the broilers.

In the drawings:—A indicates the main frame of my improved device which is preferably of a general rectangular form and may be mounted upon wheels or rollers $a$, as shown, whereby it may be readily placed over and moved from the fire box of a stove or range.

Taking loosely through suitable guides in the upper cross bars B, of the frame A, are the vertically disposed rack bars $c$, of the supporting frames B, of which two are preferably employed although it is obvious that one may be used, or if desired a series of them can be provided according to the capacity of the range or stove upon which they are to be used. These supporting vertically-movable frames B, which are preferably of a general rectangular form, respectively comprise the end bar $e$, to which one of the rack bars is connected, the longitudinal parallel side bars $f$, and the end cross bar $g$, which rests in a plane above the side bars so as to permit of the introduction of the holder or broiler and is provided with a notch $h$, at an intermediate point in its length for a purpose presently explained. The frames B, are raised and lowered through the medium of pinions $d$, which are fixed upon the longitudinal shafts $i$, which in turn are journaled upon the cross bars of the main frame and are provided with crank handles $j$, and ratchet wheels $k$, for the engagement of pawls $l$, which serve in practice to prevent casual downward movement of the frames, and yet allow the shafts $i$, to be rotated to raise them when desired. Thus it will be seen that the frames and the broilers carried thereby may be adjusted close to the fire to cook the meat or other food quickly or may be adjusted to various elevations according to how the food is to be cooked; and when the food is done and it is simply desired to keep the same warm, the frames may be raised to the full extent of their adjustment as shown in Fig. 3, of the drawings.

C, indicates the slidable frames of the holders or broilers which are of a general rectangular form and have their longitudinal side bars $m$, provided with flanges $n$, designed to engage the side bars $f$, of the vertically-adjustable, horizontal frames B, as better illustrated in Fig. 3, of the drawings. By this construction it will be seen that the frames C, may be readily slid in position upon the frames B, and as readily removed therefrom so that the meat or other food may be quickly placed in the holder, which is highly desirable.

Journaled in the end bars of the frame C, is the shaft $p$, of the holder D, which holder comprises the main section $q$, which is fixed upon the shaft $p$—and the section $r$, which is flexibly connected to the section $q$, so that the holder may be opened for the reception of the food to be cooked. The flexibly connected section $r$, of the holder is provided at its free end with a loop $s$, which is designed to be engaged by a hook $t$, upon the shaft $p$, which hook serves to lock the holder in its closed position. The shaft $p$, of the holder D, which is designed to turn the holder so as to present either side or edge of the same to the fire, is designed to be moved a slight distance, longitudinally with respect to the frame C, and is provided as shown with lateral branches $u$, designed to engage a notched lug $v$, upon one end of the frame C, to lock the holder D, in its adjusted position. By this construction it will be readily perceived that the holder may be turned so as to present either side of a piece of meat to the fire and may be locked in such position by simply pushing the shaft $p$, inwardly until one of the branches $u$, engages the lug $v$, and should it be necessary to present the edge of the meat or other article being cooked to the fire and lock the holder in such position, the same may be accomplished by adjusting the shaft $p$, so as to bring one of the branches $u$, in engagement with the notch $h$, in the end bar $g$, of the frame B, before described.

In operation the meat or other food to be cooked is secured in the holders, after which the frames of the holders are slid into position upon the vertically adjustable horizontal frames, which may be then raised to the desired position. After one side of the meat is done, the holders may be turned by simply manipulating the shafts $p$, as before described and locking the same so as to present the other side of the meat to the fire; and if necessary either edge of the meat may be presented to the fire by simply manipulating the shafts $p$, and the holders may be locked in such position by placing one of the branches $u$, in engagement with the notched lug $h$, before described. When the meat is done and it is desired to keep the same warm and wholesome until served, the frames are elevated to the extent of their adjustment and are locked in such position through the medium of the pawls $l$, before described.

From the foregoing description it will be seen that I have provided a device for broiling meats and the like which is exceedingly cheap, simple, and durable in construction, and which may be readily adjusted to cook the meat quickly or slowly, and may be manipulated so as to present all parts of the meat to the fire which is a highly important desideratum.

I would have it understood that while I have given a full and clear description of the construction of device which I have illustrated, yet I do not wish to limit myself to claiming a device of such construction only, as I am aware that some of the parts may be altered, and in some cases other devices substituted for accomplishing a similar object.

The form of apparatus shown is but one type of many constructions that might be used.

Having described my invention, what I claim is—

1. In a broiler, the combination with a suitable frame; of a meat holder, and an adjustable connection between the meat holder and the frame, whereby said holder may be moved vertically so as to carry it toward or from the fire, substantially as and for the purpose set forth.

2. In a device for broiling meats and the like, the combination with the main frame; of a holder, a frame supporting the holder, rack bars connected to the frame and taking through guides in the main frame, a shaft journaled in the main frame and having a crank at one end, pinions mounted on the shaft and engaging the rack bars, and a suitable means for locking the shaft against casual rotation, substantially as and for the purpose set forth.

3. In a broiling device, the combination with a frame and a suitable means for supporting said frame; of a rotary shaft journaled in the frame and having a longitudinal adjustment with respect to said frame, a holder mounted on the rotary shaft and adapted to turn therewith, and a suitable means for locking the shaft and securing the holder in its adjusted position, substantially as specified.

4. In a broiling device, substantially as described, the combination with a holder frame having the notched lug $v$, at one end, and a suitable means for supporting said frame; of a shaft journaled in the holder frame and having a longitudinal adjustment, a holder mounted on the shaft, and lateral branches extending from the shaft and adapted to engage the lug $v$, of the frame, substantially as described.

5. In a broiling device, substantially as described, the combination with a supporting frame having one of its end bars raised; of a slidable frame having flanges adapted to engage the side bars of the supporting frame and a meat holder mounted in said slidable frame substantially as and for the purpose set forth.

6. In a broiling device, the combination with a supporting frame; of the slidable holder frame having flanges adapted to engage the side bars of the supporting frame, a shaft journaled in the holder frame and having a longitudinal adjustment, the meat holder mounted on said shaft, and a suitable means for locking the shaft against casual rotation, substantially as specified.

7. In a broiling device, substantially as described, the combination with a frame having the raised end bar $g$, provided with the notch $h$, of the holder frame having the vertical lug $v$, and the flanges adapted to engage the side bars of the frame, the longitudinally-adjustable shaft journaled in the holder frame, and having the lateral branches $u$, and the holder mounted on the said shaft, substantially as described.

8. In a broiling device, substantially as described, the combination with a supporting frame, having the raised end bar $g$, provided with the notch $h$, of the holder frame having the flanges adapted to engage the side bars of the frame, the longitudinally-adjustable shaft journaled in the holder and having the lateral branches $u$, and the holder mounted on the said shaft, substantially as described.

9. In a broiling device, substantially as described, the combination with a frame, having the raised end bar provided with a notch at an intermediate point in its length, and a suitable means for supporting said frame; of a holder frame mounted upon the frame, the shaft journaled in the holder frame and having a longitudinal or endwise adjustment, a lateral branch extending from the shaft and adapted to engage the notch of the frame and a holder mounted on the said shaft, substantially as specified.

10. In a broiling device, substantially as described, the combination with a holder frame; of a shaft journaled therein, and the holder comprising the fixed section mounted on the shaft and the section flexibly connected to the fixed section, substantially as specified.

11. In a broiling device, substantially as described, the combination with a main frame, of a vertically adjustable frame, a suitable means for holding the frame at various elevations, a slidable frame mounted on the vertically-adjustable frame and a meat holder mounted in the slidable frame, substantially as specified.

12. In a broiling device, substantially as described, a main frame, a vertically adjustable frame, a suitable means for holding the frame at various elevations, a slidable frame mounted on the vertically-adjustable frame, a meat holder mounted and adapted to turn in the slidable frame, and a suitable means for holding the meat holder against casual rotation, substantially as specified.

In testimony whereof I affix my signature in presence of two witnesses.

JOSEPH O. BOGGS.

Witnesses:
  H. S. MYERS,
  THEODORE RICE.